US011344140B2

(12) United States Patent
Henson et al.

(10) Patent No.: US 11,344,140 B2
(45) Date of Patent: May 31, 2022

(54) DISPLAY FOR HAND-HELD ELECTRONICS

(75) Inventors: Donald Henson, Hillsboro, OR (US); Kris Schatz, Hillsboro, OR (US); Wade Wheeler, Hillsboro, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 0 days.

(21) Appl. No.: 12/351,837

(22) Filed: Jan. 10, 2009

(65) Prior Publication Data

US 2018/0049563 A1  Feb. 22, 2018

(51) Int. Cl.
*A47F 7/024* (2006.01)
*G08B 13/14* (2006.01)
*G08B 13/12* (2006.01)
*H02J 7/02* (2016.01)
*H02J 50/12* (2016.01)
*H02J 50/90* (2016.01)
*H02J 7/00* (2006.01)
*G08B 25/10* (2006.01)

(52) U.S. Cl.
CPC .......... *A47F 7/024* (2013.01); *G08B 13/1454* (2013.01); *G08B 13/1463* (2013.01); *H02J 7/0044* (2013.01); *H02J 7/025* (2013.01); *H02J 50/12* (2016.02); *H02J 50/90* (2016.02); *G08B 13/1409* (2013.01); *G08B 13/1445* (2013.01); *G08B 25/10* (2013.01)

(58) Field of Classification Search
CPC ............ G08B 13/1409; G08B 13/1445; G08B 13/1454; G08B 13/1463; H02J 7/025; H02J 50/90; H02J 50/12; A47F 7/024
USPC .... 248/187.1, 551, 68; 340/540, 541, 568.1, 340/568.2, 568.3, 568.8; 361/679.01
See application file for complete search history.

(56) References Cited

U.S. PATENT DOCUMENTS

| 883,335 A | 3/1908 | O'Connor |
| 3,274,631 A | 9/1966 | Spohr |
| 3,444,547 A | 5/1969 | Surek |
| 3,780,909 A | 12/1973 | Callahan et al. |
| 3,840,795 A | 10/1974 | Roszyk et al. |
| 4,075,878 A | 2/1978 | Best |
| 4,117,465 A | 9/1978 | Timblin |
| 4,335,931 A | 6/1982 | Kinnear |

(Continued)

FOREIGN PATENT DOCUMENTS

| AT | 506665 A1 | 10/2009 |
| CA | 2465692 A1 | 11/2004 |

(Continued)

OTHER PUBLICATIONS

"35 mm Camera Display"—Walmart Publication 1995.

(Continued)

*Primary Examiner* — Tan Le
(74) *Attorney, Agent, or Firm* — Olympic Patent Works PLLC

(57) ABSTRACT

The design described here is a new display for hand-held consumer electronic devices. The display has a mounting member, or puck, that is lifted from rest on a display surface. The puck carries a rechargeable power storage device for the hand-held device. The power storage device charges when the puck is at rest but is disconnected and powers the hand-held when the puck is lifted. The puck also carries a wireless device that outputs a security alarm signal for the purpose of indicating a theft event.

20 Claims, 11 Drawing Sheets

(56) References Cited

U.S. PATENT DOCUMENTS

| | | | |
|---|---|---|---|
| 4,354,613 A | 10/1982 | Desai et al. | |
| 4,370,020 A | 1/1983 | Davey | |
| 4,384,688 A | 5/1983 | Smith | |
| 4,590,337 A | 5/1986 | Engelmore | |
| 4,714,184 A | 12/1987 | Young et al. | |
| 4,772,878 A | 9/1988 | Kane | |
| 4,898,493 A | 2/1990 | Blankenburg | |
| 4,920,334 A | 4/1990 | DeVolpi | |
| 5,003,292 A | 3/1991 | Harding et al. | |
| 5,072,213 A | 12/1991 | Close | |
| 5,146,205 A * | 9/1992 | Keifer | A47F 7/024 340/540 |
| 5,176,465 A | 1/1993 | Holsted | |
| 5,246,183 A | 9/1993 | Leyden | |
| 5,543,782 A | 8/1996 | Rothbaum et al. | |
| 5,552,771 A | 9/1996 | Leyden et al. | |
| 5,685,436 A | 11/1997 | Davet | |
| 5,861,807 A | 1/1999 | Leyden et al. | |
| 6,039,496 A | 3/2000 | Bishop | |
| 6,170,775 B1 | 1/2001 | Kovacik et al. | |
| 6,236,435 B1 | 5/2001 | Gertz | |
| 6,314,236 B1 | 11/2001 | Taylor | |
| 6,380,855 B1 | 4/2002 | Ott | |
| 6,386,906 B1 | 5/2002 | Burke | |
| 6,476,717 B1 * | 11/2002 | Gross | A47F 7/024 340/568.1 |
| 6,502,727 B1 | 1/2003 | Decoteau | |
| 6,581,421 B2 | 6/2003 | Chmela et al. | |
| 6,659,382 B2 | 12/2003 | Ryczek | |
| 6,731,212 B2 | 5/2004 | Hirose et al. | |
| 6,748,707 B1 | 6/2004 | Buchalter et al. | |
| 6,761,579 B2 | 7/2004 | Fort et al. | |
| 6,786,766 B1 | 9/2004 | Chopra | |
| 6,799,994 B2 * | 10/2004 | Burke | G08B 13/1445 439/501 |
| 6,831,560 B2 | 12/2004 | Gresset | |
| 6,896,543 B2 | 5/2005 | Fort et al. | |
| 6,946,961 B2 | 9/2005 | Frederiksen et al. | |
| 6,961,401 B1 | 11/2005 | Nally et al. | |
| 7,015,596 B2 | 3/2006 | Pail | |
| 7,053,774 B2 | 5/2006 | Sedon et al. | |
| 7,081,822 B2 | 7/2006 | Leyden et al. | |
| 7,101,187 B1 | 9/2006 | Deconinck et al. | |
| 7,132,952 B2 | 11/2006 | Leyden et al. | |
| 7,135,972 B2 | 11/2006 | Bonato | |
| 7,154,039 B1 | 12/2006 | Marszalek et al. | |
| 7,209,038 B1 * | 4/2007 | Deconinck | G08B 13/1409 340/541 |
| 7,287,652 B2 | 10/2007 | Scholen et al. | |
| 7,327,276 B1 | 2/2008 | Deconinck et al. | |
| 7,352,567 B2 | 4/2008 | Hotelling et al. | |
| 7,385,522 B2 | 6/2008 | Belden, Jr. et al. | |
| 7,387,003 B2 | 6/2008 | Marszalek et al. | |
| 7,446,659 B2 | 11/2008 | Marsilio et al. | |
| 7,522,047 B2 | 4/2009 | Belden, Jr. et al. | |
| 7,626,500 B2 | 12/2009 | Belden, Jr. et al. | |
| 7,667,601 B2 | 2/2010 | Rabinowitz et al. | |
| 7,688,205 B2 | 3/2010 | Ott | |
| 7,701,339 B2 | 4/2010 | Irmscher et al. | |
| 7,710,071 B2 | 5/2010 | Elizalde Rodarte | |
| 7,710,266 B2 * | 5/2010 | Belden, Jr | A47F 7/024 340/568.2 |
| 7,724,135 B2 | 5/2010 | Rapp et al. | |
| 7,736,846 B2 | 6/2010 | Masuda et al. | |
| 7,737,843 B2 | 6/2010 | Belden, Jr. et al. | |
| 7,737,844 B2 | 6/2010 | Scott et al. | |
| 7,737,845 B2 | 6/2010 | Fawcett et al. | |
| 7,737,846 B2 | 6/2010 | Belden, Jr. et al. | |
| 7,744,404 B1 | 6/2010 | Henson et al. | |
| 7,909,641 B1 | 3/2011 | Henson et al. | |
| 7,969,305 B2 | 6/2011 | Belden, Jr. et al. | |
| 7,971,845 B2 | 7/2011 | Galant | |
| 8,009,348 B2 | 8/2011 | Zehner et al. | |
| D649,076 S | 11/2011 | Alexander | |
| 8,102,262 B2 | 1/2012 | Irmscher et al. | |
| D663,972 S | 7/2012 | Alexander et al. | |
| 8,499,384 B2 | 8/2013 | Zerhusen | |
| 8,558,688 B2 | 10/2013 | Henson et al. | |
| 8,698,617 B2 | 4/2014 | Henson et al. | |
| 8,698,618 B2 | 4/2014 | Henson et al. | |
| 8,749,194 B1 | 6/2014 | Kelsch et al. | |
| 8,814,128 B2 * | 8/2014 | Trinh | A47F 7/024 248/187.1 |
| 8,844,972 B2 | 9/2014 | Riley et al. | |
| 8,847,759 B2 | 9/2014 | Bisesti et al. | |
| 8,904,686 B2 | 12/2014 | Greer | |
| 8,955,807 B2 | 2/2015 | Alexander et al. | |
| 8,963,498 B2 | 2/2015 | Ferguson | |
| 9,092,960 B2 | 7/2015 | Wheeler | |
| 9,097,380 B2 | 8/2015 | Wheeler | |
| 9,105,167 B2 | 8/2015 | Fawcett | |
| 9,220,358 B2 | 12/2015 | Wheeler et al. | |
| 9,269,247 B2 | 2/2016 | Fawcett et al. | |
| 9,303,809 B2 | 4/2016 | Reynolds et al. | |
| 9,373,236 B2 | 6/2016 | Oehl et al. | |
| 9,396,631 B2 | 7/2016 | Fawcett et al. | |
| 9,478,110 B2 | 10/2016 | Fawcett et al. | |
| 9,576,452 B2 | 2/2017 | Fawcett et al. | |
| 9,659,472 B2 | 5/2017 | Fawcett et al. | |
| 9,786,140 B2 | 10/2017 | Henson et al. | |
| 10,026,281 B2 | 7/2018 | Henson et al. | |
| 2001/0049222 A1 | 12/2001 | Fort et al. | |
| 2002/0085343 A1 | 7/2002 | Wu et al. | |
| 2002/0162366 A1 | 11/2002 | Chmela et al. | |
| 2003/0007634 A1 | 1/2003 | Wang | |
| 2003/0010859 A1 | 1/2003 | Ryczek | |
| 2004/0003150 A1 | 1/2004 | Deguchi | |
| 2004/0029498 A1 | 2/2004 | Neff | |
| 2004/0077210 A1 | 4/2004 | Kollmann | |
| 2004/0201449 A1 | 10/2004 | Denison et al. | |
| 2005/0073413 A1 | 4/2005 | Sedon et al. | |
| 2005/0088572 A1 | 4/2005 | Pandit et al. | |
| 2005/0113036 A1 | 5/2005 | Lita | |
| 2005/0165806 A1 | 7/2005 | Roatis et al. | |
| 2005/0206522 A1 | 9/2005 | Leyden et al. | |
| 2006/0001541 A1 | 1/2006 | Leyden et al. | |
| 2006/0097875 A1 | 5/2006 | Ott | |
| 2007/0075914 A1 | 4/2007 | Bates | |
| 2007/0159328 A1 | 7/2007 | Belden et al. | |
| 2007/0194918 A1 | 8/2007 | Rabinowitz et al. | |
| 2007/0229259 A1 | 10/2007 | Irmscher et al. | |
| 2008/0168806 A1 | 7/2008 | Belden et al. | |
| 2008/0169923 A1 | 7/2008 | Belden et al. | |
| 2008/0204239 A1 | 8/2008 | Marszalek et al. | |
| 2008/0222849 A1 | 9/2008 | Lavoie | |
| 2009/0007390 A1 | 1/2009 | Tsang et al. | |
| 2009/0033492 A1 | 2/2009 | Rapp et al. | |
| 2009/0173868 A1 | 7/2009 | Fawcett et al. | |
| 2009/0322278 A1 | 12/2009 | Franks et al. | |
| 2010/0007482 A1 | 1/2010 | Leyden et al. | |
| 2010/0081473 A1 | 4/2010 | Chatterjee et al. | |
| 2010/0146308 A1 | 6/2010 | Gioscia et al. | |
| 2011/0068919 A1 | 3/2011 | Rapp et al. | |
| 2011/0068920 A1 | 3/2011 | Yeager et al. | |
| 2011/0254661 A1 | 10/2011 | Fawcett et al. | |
| 2011/0283754 A1 | 11/2011 | Ezzo et al. | |
| 2011/0303816 A1 | 12/2011 | Horvath et al. | |
| 2011/0309934 A1 | 12/2011 | Henson et al. | |
| 2012/0037783 A1 | 2/2012 | Alexander et al. | |
| 2012/0043451 A1 | 2/2012 | Alexander et al. | |
| 2012/0119910 A1 | 5/2012 | Belden, Jr. et al. | |
| 2012/0205326 A1 | 8/2012 | Richter et al. | |
| 2012/0217371 A1 | 8/2012 | Abdollahzadeh et al. | |
| 2012/0280810 A1 | 11/2012 | Wheeler | |
| 2012/0286118 A1 | 11/2012 | Richards | |
| 2013/0026322 A1 | 1/2013 | Wheeler et al. | |
| 2013/0043369 A1 | 2/2013 | Wheeler | |
| 2013/0161054 A1 | 6/2013 | Allison et al. | |
| 2013/0168527 A1 | 7/2013 | Wheeler et al. | |
| 2013/0238516 A1 | 9/2013 | Moock et al. | |
| 2013/0268316 A1 | 10/2013 | Moock et al. | |
| 2014/0159898 A1 | 6/2014 | Wheeler et al. | |
| 2014/0168884 A1 | 6/2014 | Wylie | |

(56) References Cited

U.S. PATENT DOCUMENTS

| | | |
|---|---|---|
| 2015/0048625 A1 | 2/2015 | Weusten et al. |
| 2016/0042620 A1 | 2/2016 | Dandie et al. |
| 2016/0239796 A1 | 8/2016 | Grant et al. |
| 2017/0193780 A1 | 7/2017 | Moock et al. |
| 2017/0345266 A1 | 11/2017 | Henson et al. |
| 2018/0025596 A1 | 1/2018 | Henson et al. |
| 2018/0049563 A1 | 2/2018 | Henson et al. |
| 2018/0144593 A1 | 5/2018 | Henson et al. |

FOREIGN PATENT DOCUMENTS

| | | |
|---|---|---|
| DE | 202009013722 U1 | 1/2011 |
| EP | 0745747 A1 | 12/1996 |
| EP | 1575249 A2 | 9/2005 |
| ES | 1058183 U | 11/2004 |
| FR | 2595227 A1 | 9/1987 |
| FR | 2768906 A1 | 4/1999 |
| FR | 2868459 A1 | 10/2005 |
| GB | 2427056 A | 12/2006 |
| GB | 2440600 A | 2/2008 |
| JP | H0573857 U | 10/1993 |
| JP | H0668913 A | 3/1994 |
| JP | 1997-259368 | 10/1997 |
| JP | 3100287 B2 | 10/2000 |
| WO | 1997031347 A1 | 8/1997 |
| WO | 2004038670 A1 | 5/2004 |
| WO | 2009001273 A1 | 12/2008 |
| WO | 2009042905 A1 | 4/2009 |
| WO | 2011045058 A2 | 4/2011 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A2 | 7/2014 |
| WO | 2014134718 A1 | 9/2014 |
| WO | 2015050710 A2 | 4/2015 |
| WO | 2015051840 A1 | 4/2015 |

OTHER PUBLICATIONS

"Declaration of Mike Cook", *Vanguard Products Group, Inc. v. Merchandising Technologies, Inc.*, Case No. 3:10-cv-392-BR, U.S. District Court for the District of Oregon, Oct. 20, 2010, pp. 1-7.
"Declaration of Thaine Allison in Support of Patent Owner's Reply to Petitioner's Opposition to Patent Owner's Motion to Amend", Inter Partes Review of U.S. Pat. No. 7,909,641, Case IPR2013-00122, Feb. 5, 2014, pp. 1-13.
"Deposition of Thaine Allison, III", Inter Partes Review of U.S. Pat. No. 7,909,641, Case IPR2013-00122, Feb. 24, 2014, pp. 1-198.
"MTI Freedom Universal 2.0 Product Manual", Dec. 2008, pp. 1-21.
"Reasons for Substantial New Question of Patentability and Supplemental Examination Certificate", Inter Partes Review of U.S. Pat. No. 7,909,641, Case IPR2013-00122, Jan. 30, 2013, pp. 1-12.
Excerpts from Bruce Schneier, Applied Cryptography: Protocols, Algorithms, and Source Code in C (1994).
International Search Report for PCT/US2011/037235 dated Oct. 21, 2011.
MTI 2008 PowerPoint, "Vanguard Program" (Exhibit 1005 of Declaration of Mike Cook), pp. 1-9.
PropelInteractive, "Freedom Universal 2 Animation_003.wmv", YouTube Video https://www.youtube.com/watch?v=_odGNnQv0BQ &t=1s, published on Feb. 16, 2010 (see sample screenshots, pp. 1-24).
PropelInteractive, "Installing LP3 Old Version", YouTube Video https://www.youtube.com/watch?v=FRUaOFWiDRw&t=1s, published on Jun. 28, 2010 (see sample screenshots, pp. 1-9).
PropelInteractive, "MTI LP3 Product Mounting", YouTube Video https://www.youtube.com/watch?v=KX4TEuj1jCl, published on Jun. 23, 2010 (see sample screenshots, pp. 1-11).
Prosecution History for U.S. Appl. No. 12/819,944, now U.S. Pat. No. 8,698,617, filed Jun. 21, 2010.
Prosecution History for U.S. Appl. No. 12/888,107, now U.S. Pat. No. 8,698,618, filed Sep. 22, 2010.
Prosecution History for U.S. Appl. No. 13/457,348, now U.S. Pat. No. 8,558,688, filed Apr. 26, 2012.
Prosecution History for U.S. Appl. No. 14/066,606, filed Oct. 29, 2013 (now abandoned).
Prosecution History for U.S. Appl. No. 14/092,845, filed Nov. 27, 2013 (now abandoned).
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
RetailGeek, "Virtual Tour of MTI Retail Innovation Center in 2009," YouTube Video https://www.youtube.com/watch?v=-wUvcDAmhj0, published on Aug. 2, 2010 (see transcript and sample screenshots, pp. 1-20).
Reuters, "MTI Begins Shipping Freedom™ Universal 2.0 Merchandising Solution", Oct. 1, 2008, pp. 1-3.
U.S. Appl. No. 61/607,802, filed Mar. 7, 2012.
U.S. Appl. No. 61/620,621, filed Apr. 5, 2012.
U.S. Appl. No. 61/774,870 filed Mar. 8, 2013.
U.S. Appl. No. 61/884,098, filed Sep. 29, 2013.
Unicam Europe, "Freedom Lp3 4.17.09", SlideShare Presentation https://www.slideshare.net/Borfu/freedom-lp3-41709, published on Jul. 28, 2009 (pp. 1-9).
"Complaint for Civil Contempt, Breach of Contract, Declaratory Judgment, Injunction and Accounting", *Vanguard Products Group, Inc., and Telefonix, Inc. v. Merchandising Technologies, Inc.*, Case No. 3:10-cv-392 (USDC, District of Oregon, Portland Division) dated Dec. 13, 2017, pp. 1-39 (cited as Exhibit B in IDS Citation Nos. 2 & 3).
"Complaint for Injunction and Damages", *Mobile Tech., Inc. d/b/a Mobile Technologies Inc. and MTI v. Invue Security Products Inc.*, Case No. 2:17-cv-07491 (Central District of California, Western Division) dated Oct. 13, 2017, pp. 1-83.
"Declaration of Thaine Allison", *Vanguard Products Group, Inc., and Telefonix, Inc. v. Merchandising Technologies, Inc.*, Case No. 3:10-cv-392 (USDC, District of Oregon) dated Dec. 13, 2017, pp. 1-16 (cited as Exhibit C in IDS Citation Nos. 2 & 3).
"Defendant's Amended Answer and Counterclaim to Complaint for Injunction and Damages", *Mobile Tech., Inc. d/b/a Mobile Technologies Inc. and MTI v. Invue Security Products Inc.*, Case No. 3:18-cv-00052 (Western District of North Carolina, Charlotte Division) dated Feb. 2, 2018, pp. 1-77.
"Defendant's Answer and Counterclaim to Complaint for Injunction and Damages", *Mobile Tech., Inc. d/b/a Mobile Technologies Inc. and MTI v. Invue Security Products Inc.*, Case No. 2:17-cv-07491 (Central District of California, Western Division) dated Dec. 13, 2017, pp. 1-53.
"Final Judgment by Consent and Permanent Injunction", *Vanguard Products Group, Inc., and Telefonix, Inc. v. Merchandising Technologies, Inc.*, Case No. 3:07-cv-1405 (USDC, District of Oregon) dated May 11, 2009, pp. 1-5 (cited as Exhibit A in IDS Citation Nos. 2 & 3).
"Plaintiffs Answer to Defendant's Counterclaims", *Mobile Tech., Inc. d/b/a Mobile Technologies Inc. and MTI v. Invue Security Products Inc.*, Case No. 2:17-cv-07491 (Central District of California, Western Division) dated Jan. 12, 2018, pp. 1-20.
Extended European Search Report for EP11827111.3 dated Oct. 30, 2017.
Freedom LP3 brochure, MTI, Sep. 2009, 1 page.
Freedom LP3 Product Manual, MTI, Mar. 2010, pp. 1-20.
Freedom LP3 Product Manual, MTI, Mar. 2011, pp. 1-25.
Freedom LP3 Quick Reference Guide, MTI, Feb. 2010, pp. 1-2.
Freedom One Product Manual, MTI, Jun. 2011, pp. 1-32.
Freedom One Product Manual, MTI, Jun. 2012, pp. 1-32.
Freedom One Sell Sheet, MTI, 2012, pp. 1-2.

(56) References Cited

OTHER PUBLICATIONS

Machine Translation of WO2011/045058 published Apr. 21, 2011 (LOGOKETT GMBH).
Office Action for U.S. Appl. No. 12/351,837 dated May 18, 2018.
Prosecution History for U.S. Appl. No. 15/221,497, now U.S. Pat. No. 9,786,140, filed Jul. 27, 2016.
Prosecution History for U.S. Appl. No. 15/679,620, filed Aug. 17, 2017.
Prosecution History for U.S. Appl. No. 15/724,914, filed Oct. 4, 2017.
Prosecution History for U.S. Appl. No. 15/826,017, now U.S. Pat. No. 10,026,281, filed Nov. 29, 2017.
Response for Extended European Search Report for EP11827111.3 dated Oct. 30, 2017.
"281 Patent File History" at Exhibit X1025 in PGR2019-00019, filed Nov. 21, 2018, 193 pages.
"837 Patent Application Select File History" at Exhibit X1026 in PGR2019-00019, filed Nov. 21, 2018, 158 pages.
"2009 Virtual Store Tour Video Transcript" at Exhibit X1015 in PGR2019-00019, filed Nov. 21, 2018, 4 pages.
"ADS filed in U.S. Appl. No. 14/092,845 (Wheeler)" at Exhibit X1032 in PGR2019-00019, filed Nov. 21, 2018, 7 pages.
"Complaint for Injunction and Damages for Patent Infringement" (asserting U.S. Pat. No. 10,026,281), *Mobile Tech, Inc.* v. *InVue Security Products, Inc.,* Case 3:18-cv-00505-RJC-DSC, United States District Court for the Northern District of Ohio, Filed Jul. 17, 2018, 21 pages.
"Curriculum Vitae of Harry Direen" at Exhibit X1019 in PGR2019-00019, filed Nov. 21, 2018, 25 pages.
"Curriculum Vitae of Harry Direen, Ph.D." at Exhibit X1014 in IPR2019-00078 and IPR2019-00079, filed Oct. 12, 2018, 25 pages.
"Dec. 2, 2016 Office Action for '140 Patent" at Exhibit X1043 in IPR2019-00078 and IPR2019-00079, filed Oct. 12, 2018, 6 pages.
"Declaration of Harry Direen, PhD" at Exhibit X1005 in IPR2019-00078 and IPR2019-00079, filed Oct. 12, 2018, 71 pages.
"Disclosure of U.S. Appl. No. 12/819,944 (Jun. 21, 2010)" at Exhibit X1046 in IPR2019-00078 and IPR2019-00079, filed Oct. 12, 2018, 70 pages.
"Disclosure of U.S. Appl. No. 14/066,606 (Oct. 29, 2013)" at Exhibit X1047 in IPR2019-00078 and IPR2019-00079, filed Oct. 12, 2018, 74 pages.
"Disclosure of U.S. Appl. No. 14/092,845 (Nov. 27, 2013)" at Exhibit X1048 in IPR2019-0007 and IPR2019-000798, filed Oct. 12, 2018, 49 pages.
"Excerpt of MTI Petition in IPR2017-01901" at Exhibit X1027 in PGR2019-00019, filed Nov. 21, 2018, 3 pages.
"Expert Declaration of H. Direen" at Exhibit X1005 in PGR2019-00019, filed Nov. 21, 2018, 50 pages.
"Henson '281 Patent Prosecution History—Priority Change" at Exhibit X1010 in PGR2019-00019, filed Nov. 21, 2018, 27 pages.
"InVue Security Product Inc.'s Answer and Counterclaims to Complaint", *Mobile Tech, Inc.* v. *InVue Security Products, Inc.,* Case 3:18-cv-00505-RJC-DSC, United States District Court for the Western District of North Carolina, Filed Sep. 25, 2018, 579 pages.
"InVue's Answer to Complaint—California Litigation" at Exhibit X1011 in PGR2019-00019, filed Nov. 21, 2018, 53 pages.
"InVue's Answer to Complaint—N.C. Litigation" at Exhibit X1029 in PGR2019-00019, filed Nov. 21, 2018, 77 pages.
"IPR2018-00481 Paper No. 1" at Exhibit X1018 in PGR2019-00019, filed Nov. 21, 2018, 73 pages.
"Judicial Admission of Video Publication Date" at Exhibit X1013 in PGR2019-00019, filed Nov. 21, 2018, 33 pages.
"Mar. 2010 MTI LP3 Product Manual" at Exhibit X1024 in PGR2019-00019, filed Nov. 21, 2018, 20 pages.
"MTI 2008 Freedom Universal 2.0 Product Manual" at Exhibit X1040 in IPR2019-00078 and IPR2019-00079, filed Oct. 12, 2018, 21 pages.
"MTI 2010 Freedom LP3 Product Manual" at Exhibit X1017 in IPR2019-00078 and IPR2019-00079, filed Oct. 12, 2018, 20 pages.
"MTI 2011 Freedom LP3 Product Manual" at Exhibit X1018 in IPR2019-00078 and IPR2019-00079, filed Oct. 12, 2018, 25 pages.
"MTI 2011 Freedom One Product Manual" at Exhibit X1039 in IPR2019-00078 and IPR2019-00079, filed Oct. 12, 2018, 32 pages.
"MTI Admission of Video Publication" at Exhibit X1016 in PGR2019-00019, filed Nov. 21, 2018, 14 pages.
"MTI Amendment and Response in U.S. Appl. No. 15/679,620, filed on Apr. 10, 2018" at Exhibit X1022 in IPR2019-00078 and IPR2019-00079, filed Oct. 12, 2018, 23 pages.
"MTI Amendment and Response in U.S. Appl. No. 15/724,941, filed on Jul. 30, 2018" at Exhibit X1028 in IPR2019-00078 and IPR2019-00079, filed Oct. 12, 2018, 14 pages.
"MTI Office Action Respnse—'837 Application" at Exhibit X1030 in PGR2019-00019, filed Nov. 21, 2018, 4 pages.
"MTI Virtual Store Tour Video Publication Transcript" at Exhibit X1010 in IPR2019-00078 and IPR2019-00079, filed Oct. 12, 2018, 4 pages.
"MTI-Vanguard Settlement Agreement" at Exhibit X1011 in IPR2019-00078 and IPR2019-00079, filed Oct. 12, 2018, 39 pages.
"Parent U.S. Appl. No. 14/092,845 ADS" at Exhibit X1038 in IPR2019-00078 and IPR2019-00079, filed Oct. 12, 2018, 7 pages.
"Patent Owner's Preliminary Response Under 37 C.F.R. 42. 107", Inter Partes Review of U.S. Pat. No. 9,786,140, Case IPR2019-00078, Feb. 6, 2019, 51 pages.
"Patent Owner's Preliminary Response Under 37 C.F.R. 42. 107", Inter Partes Review of U.S. Pat. No. 9,786,140, Case IPR2019-00078, Feb. 6, 2019, 68 pages.
"PowerPro Detangler Publication" at Exhibit X1035 in IPR2019-00078 and IPR2019-00079, filed Oct. 12, 2018, 1 page.
"PowerPro System Publication" at Exhibit X1036 in IPR2019-00078 and IPR2019-00079, filed Oct. 12, 2018, 2 pages.
"Request for Supplemental Examination by MTI" at Exhibit X1037 in IPR2019-00078 and IPR2019-00079, filed Oct. 12, 2018, 7 pages.
"Text Comparison—'281 Patent and '898 Publication" at Exhibit X1031 in PGR2019-00019, filed Nov. 21, 2018, 32 pages.
"U.S. Appl. No. 12/351,837—Published (Henson)" at Exhibit X1009 in IPGR2019-00019, filed Nov. 21, 2018, 18 pages.
"U.S. Appl. No. 12/819,944 (MTI)" at Exhibit X1028 in PGR2019-00019, filed Nov. 21, 2018, 70 pages.
Petition for Inter Partes Review for U.S. Pat. No. 9,786,140; Case IPR2019-00078, Filed Oct. 12, 2018, 79 pages.
Petition for Inter Partes Review for U.S. Pat. No. 9,786,140; Case IPR2019-00079, Filed Oct. 12, 2018, 76 pages.
Petition for Post-Grant Review for U.S. Pat. No. 10,026,281; Case PGR2019-00019, Filed Nov. 21, 2018, 99 pages.
Translation of WO 2011/045058.

\* cited by examiner

DISPLAY FOR HAND-HELD ELECTRONICS

TECHNICAL FIELD

The invention disclosed here generally relates to the retail display of hand-held electronic devices. More particularly, the invention relates to an improved way to manage device power and alarm functions when one device is swapped with another from a display.

BACKGROUND OF THE INVENTION

Retailers commonly sell hand-held electronic devices (i.e., video cameras, digital cameras, cell phones, etc.) via in-store countertop displays. These displays often have a number of "post" positions where product models are mounted to a countertop.

The most common type of display uses a mounting piece or "puck" that is connected to the underside of the hand-held. The puck typically rests on a base piece on the countertop. The puck is lifted from the base piece and put back when a consumer wishes to handle the product. The puck is physically and electrically tethered to the display by a conventional, "multi-conductor" retractor cable.

The retractor cable is called "multi-conductor" because it typically consists of multiple numbers of individually insulated conductor wires surrounded by an exterior sheath. The conductor wires deliver electrical power to the puck (for powering the hand-held) and also provide electrical signal wires for alarm functions. The number of individual conductor wires in the cable may vary for different reasons.

Display posts have evolved over the years in a way that parallels the many changes, improvements, and evolutions of hand-held products in the consumer electronic market. Given that hand-held product models change on a regular basis, a need has arisen to develop display post systems that make it easy to swap one type of product (or "hand-held") with another off the puck.

The retailers who purchase systems of this type for in-store customer displays want display posts that allow sales people to make product swaps easily, with little or no training, and with no significant or complicated cable management and power supply changes. From the standpoint of the sales person, the best type of design is one that allows the sales person to easily detach one hand-held from the puck and replace it with another, making the necessary electrical connections using only a short cable between the puck and hand-held.

One of the earlier display post designs of this type used a multi-conductor retractor cable that had several power wires in it, each of which supplied a unique operating voltage that was intended to match a specific kind of device. For example, one wire provided a standardized high voltage for devices that needed high power (e.g., a video camera), another wire provided a standardized low voltage for devices requiring lower power (e.g., a cell phone), and so forth.

The system described above employed a short patch cord that interconnected the hand-held with a modular connector on the end of the retractor cable. One end of the cord plugged into the power socket on the device. The other end had a "pinned" connector that plugged directly into the modular connector on the end of the retractor cable.

The pins of the patch cord connector were customized for specific electronic devices. A single power pin on the patch cord connector uniquely mated with one power socket out of several offered within the body of the other modular connector on the end of the retractor cable (each socket corresponding to different power wires within the retractor cable). In this way, a pin-to-socket connection was used to select the correct power wire for the device (that is, one power wire within the many offered by the multi-conductor retractor). One type of device was easy to swap with another because it could be done by swapping patch cords having a different pin that matched a different power socket in the retractor cable's modular connector.

The above design was described in U.S. Pat. Nos. 6,386,906 and 6,799,994. This design has drawbacks, however, and it did not appear to be accepted by the marketplace. First, the voltage delivered to the end of the retractor cable tends to vary because of the length of the wire spooled onto the retractor's reel, which is related to the low voltage and current of the electrical power transmitted through the retractor cable's conductor wires. This was not acceptable because early hand-held designs, in particular, tended to malfunction in response to relatively minor variations in power supply voltages. Second, this early design was limited by the specific number of individual power lines running through the retractor cable—which defined a finite number of power selection options. Thus, it was inflexible to new hand-held models if they had different power requirements from the ones previously used.

In or about 1999 or 2000, the assignee of the present invention created an improvement to the above design. This new or next generation design employed a single power line in a retractor cable that supplied adequate power at a voltage sufficiently high to power any hand-held product. The power line connected to an electronics control board ("ECB") within the puck. Among other things, the ECB included voltage regulator circuitry for stabilizing the voltage in the puck at a steady and consistent level that did not materially fluctuate, at the puck's location, regardless of upstream variations of current and voltage in the power line.

In this next generation, the hand-held, mounted to the puck, connects to the ECB by a dedicated patch cord or "smart" cable. The smart cable has a circuit with a resistor in it that steps down the voltage from the ECB to the precise level needed by the hand-held.

Although the above design was subsequent in time to the design described in U.S. Pat. Nos. 6,386,906 and 6,799,994, it is believed the second design was the first one to be commercially successful, because it solved the technical problems described above that are specifically attributable to the earlier design.

In the second design, different smart cables were provided for different hand-helds, depending on individual power needs, which allowed easy swapping of one product model with the next. However, unlike the first design, the second one eliminated the use of mechanical "pins" and the need for modular electrical cable connectors to swap hand-held products. Instead, the second design's smart cable used a unique resistance value built into an electrical power circuit, all within the smart cable, which connected the puck to the hand-held. Using different resistance values in different smart cables (corresponding to the electrical requirements of different products) enabled products to be swapped to and from the puck easily and more flexibly.

While it was a significant improvement, the on-going drawback to the above smart cable design is that it continues to require use of a multi-conductor retractor cable as both a physical tether and source of electrical power and other signals. The ongoing problem relates to wear and tear. The retractor cable invariably goes through many pulling and retraction cycles by consumers as they lift the product from the display over time.

From the standpoint of electrical functions, the eventual wear caused by the retractor cycling action leads to related electrical connection problems between the ECB in the puck and upstream power and signal source modules that are located underneath the countertop (that is, modules that are connected to the ECB in the puck via the retractor cable). These connection problems ultimately result in things like the hand-held not receiving power or alarms going off when they should not go off—which are not desirable outcomes for the retailer.

Moreover, multi-conductor retractor cables are not physically robust. The wires within the cable are thin in diameter and relatively easy to break or cut. The exterior sheath on the multi-conductor retractor cable wears and becomes frayed relatively quickly. From the standpoint of a physical tether, multi-conductor retractor cables lack the strength of conventional steel cable retractors. In fact, there was an earlier time in the consumer display market when steel retractor cables were used to tether retail products to countertops, if security against theft was of concern.

Multi-conductor retractor cables eventually replaced steel cables because of evolving power and security requirements, along with the desire to minimize the total number of power and security cables, etc. That is, rather than have multiple numbers of unorganized power and security alarm wires extending to an electronic product on a display countertop from power adapters and control modules below a countertop, all of the wiring evolved into the multiple number of conductors resident within a single, multi-conductor retractor cable. If the multi-conductor retractor cable is cut, then an alarm sensor circuit provided by the conductors in the cable will be broken—which will generate a signal to the retailer that someone is probably stealing the product.

This type of product evolution caused multi-conductor retractor cables to supplant the physical tethering function of steel cable retractors. However, even with modern sensor circuits that automatically signal an alarm when the retractor cable is cut or broken in some way, multi-conductor retractor cables continue to be regarded as less secure than the older-style steel cable retractors, simply because steel cables are physically stronger and difficult to cut in the store without drawing attention.

The design described below offers the next generation of puck and patch cord display post for selling hand-held consumer electronics that is intended to provide an alternative to the multi-conductor retractor system described above.

SUMMARY OF THE INVENTION

The invention disclosed here is an improved display for hand-held consumer electronic devices like digital cameras, cell phones, digital camcorders, GPS devices, etc. The display is intended to be used in retail environments where large numbers of individual electronic devices are displayed in an array. The invention is an improved version of the puck and patch cord display system that is currently in use in the retail industry.

Like prior designs, the display disclosed here has a mounting member for the electronic device. As indicated above, this member is usually referred to as a "puck." The puck provides a housing for necessary power and alarm electronics and, at the same time, a movable platform for bearing the hand-held that is to be offered for sale on the display. The physical size of the puck will vary according to retailer application.

The display includes a post or similar base piece that is connected to a countertop or similar surface. The base piece provides a fixed resting point for the puck. The physical implementation of the base piece also varies. Sometimes it has a very low profile relative to the countertop. Other times it takes the form of a short post.

The present invention is differentiated from prior designs because it successfully eliminates the need or requirement for a multi-conductor retractor cable in order to provide power and security alarm functions for the display. In other words, both hand-held power and security alarm functions can be sourced through the puck wirelessly—without needing the hard wiring (i.e., multiple conductors) within a retractor cable that spools to and from a reel.

The design disclosed here utilizes a rechargeable power storage device carried by the puck (e.g., a single battery or multiple batteries)—with the rechargeable power storage device traveling with the puck as it is lifted from the display surface. When the puck is at rest, single input power is delivered to an electronics board or ECB that is resident within the puck. The power input is delivered from a conventional power supply, or power source, at that particular time only. The power input connection occurs via contacts that are brought together when the puck is placed on or in the base piece on the display surface. At that time only, the rechargeable power storage device carried by the puck is electrically coupled to power, and recharges, via the puck ECB.

The power supply is usually resident within the control module under the countertop, although this could be a variable. The ECB inside the puck serves as a power manifold and electronics control for the rechargeable storage device and other components, as needed, for accomplishing hand-held power and security alarm functions.

When the puck is subsequently lifted from the display surface, the rechargeable power storage device (once again, carried by the puck) is decoupled from the power source. At that time, the power storage device independently enables the operation of the hand-held and/or other electronic components carried by the puck (e.g., security alarm circuitry or other control functions inside the puck's housing) for a period of time sufficient to allow a consumer to handle the product and determine how it works. When the puck is returned to the display, the power storage device reconnects to the power source for another recharging cycle.

The hand-held is detachably mounted to the puck, so that one hand-held can be swapped with another kind. The hand-held is electrically connected to the puck via a short patch cord that will also be swapped (at least typically) when hand-helds are changed. Other kinds of primary and secondary alarm sensors, common to the industry, may interconnect hand-held and puck, depending on retailer needs. In all cases, the combination of hand-held, puck, patch cord and alarm sensor components are collectively decoupled from direct and continuous contact with the power source under the countertop when the puck is lifted.

Once again, the above arrangement eliminates the need for the kinds of multi-conductor retractor cables used in earlier designs, along with the drawbacks attached to the same. However, if desired, a conventional steel cable retractor may be used to tether the puck to the display, thereby replacing the security function of the less physically robust multi-conductor retractor cable used in the past. Because steel cables are harder to cut, they provide a higher level of physical security against theft or unauthorized removal. They also do not have the same long-term wear problems that attach to multi-conductor cables (which typically have a soft material sheath that surrounds the interior wires).

It is possible to implement the rechargeable storage device in different ways, depending on the needs of the retailer and the specific model or type of hand-held that is displayed. For some hand-helds, it will be possible to take advantage of the battery that is normally part of the product. Cell phones will often have their batteries in place, on the display, in order to be operated by a potential customer. In this particular case, it is possible to configure the puck electronics, or ECB, so that a single input, power-charging connection is made to the cell phone battery via the puck's ECB when the puck is at rest. The cell phone's battery charges and operates in conventional fashion, using the puck as a pass-through platform for recharging purposes. According to this particular example, the cell phone battery serves as the "power storage device" that is carried by or travels with the puck, although it is to be understood that this arrangement is physically more indirect, because the cell phone battery is not housed directly within the body of the puck.

Alternatively, the footprint of the puck, or the puck housing, can be designed so that it carries a separate battery that is adequate to independently supply power to the electronic device, the ECB, and other puck electronics, as needed. This example can be made to apply to other kinds of hand-helds that are not displayed with their own batteries and/or will operate without batteries in place.

Yet another hybrid version of the design disclosed here may involve using an independent rechargeable battery in the puck, for supplying power to puck electronics, while, at the same time, taking advantage of the handheld's rechargeable battery. In other words, in this version, the "power storage device" carried by the puck comprises two batteries, both carried by the puck at the same time—one in the puck and the other on the displayed product.

In this last example, the battery in the puck may provide power for driving alarm and other kinds of display features or ECB functions, while the hand-held battery still provides primary power to just the hand-held. Similar to the other versions described above, charging of these multiple battery components occurs via a single power input to puck circuitry (the ECB) when the puck is at rest. They discharge as needed to provide hand-held power and alarm functions after the puck is lifted from the base piece.

All of these alternatives are considered to fall within the scope of claim language calling for a power storage device that is carried by or travels with the puck, unless amendments and arguments relating to this disclosure, as reflected in U.S. Patent Office records, should subsequently indicate otherwise. Moreover, the rechargeable power storage device carried by the puck might include other kinds of electrical storage devices, like capacitance devices, for example.

As explained previously, electronic retail displays have been reliant on multi-conductor retractor cables because they need multiple lines to the puck for different functions (i.e., power and security). If one reviews prior art designs that involve electrical security alarms (e.g., RE 37,590) or attempts at providing universal power (e.g., U.S. Pat. Nos. 6,386,906 and 6,799,994), they share a common limitation in that all involve use of a continuous electrical line, or lines, between a control module under the countertop and the puck. In all of these cases, the necessary lines are provided by a retractor cable.

Therefore, in accordance with the conceptual difference between the design disclosed here and the prior art, the present design wirelessly severs the puck-mounted power and alarm circuitry from prior reliance on conductor wires in a retractor cable. A steel retractor cable ("steel tether") is the only cabling necessary for connecting puck to countertop, if such cable is desired. And, while it may be desirable to continue using a steel tether, the present invention allows a combined hand-held/puck/patch cord implementation that can provide power and a security alarm without any physical tethering at all. In other words, while many retailers may desire a steel tether for the physical security it provides against theft, it is possible to do without, because the design described here also provides wireless security alarm functionality.

The present design provides security alarm functions via an ECB-controlled wireless device, or wireless transmitter, that is also carried by the puck. The rechargeable power storage device carried by the puck, as per the above description, also powers the wireless device. It preferably operates in conjunction with one or more conventional alarm sensors that may include, for example, a mechanically triggered sensor, or a secondary alarm sensor. Sensors of this kind are common to existing display designs.

The wireless device in the puck communicates an active wireless signal from the puck to a control module that is located under the display countertop or elsewhere. The wireless signal from the puck changes if an alarm sensor is triggered in some way—which indicates a theft event or the like. In all cases, however, the security functionality is essentially closed to the arrangement of puck and hand-held, with the wireless device providing the means for indicating an alarm event to a control module, in lieu of transmitting the alarm event as a security signal through a wire in a multi-conductor cable, as was done in the past.

Alternatively, the physical proximity of the wireless device to the control module (under the countertop or elsewhere) may allow for the triggering of an alarm signal due to the increased distance caused by an unauthorized removal event. The wireless device operates both when the puck is at rest and when it is lifted from the base piece.

The above features are further described in the following more detailed description, which is to be read in conjunction with the drawings.

BRIEF DESCRIPTION OF THE DRAWINGS

In the drawings, like reference numerals and letters refer to like parts throughout the various views, and wherein.

DESCRIPTION OF THE INVENTION

Figure 1:
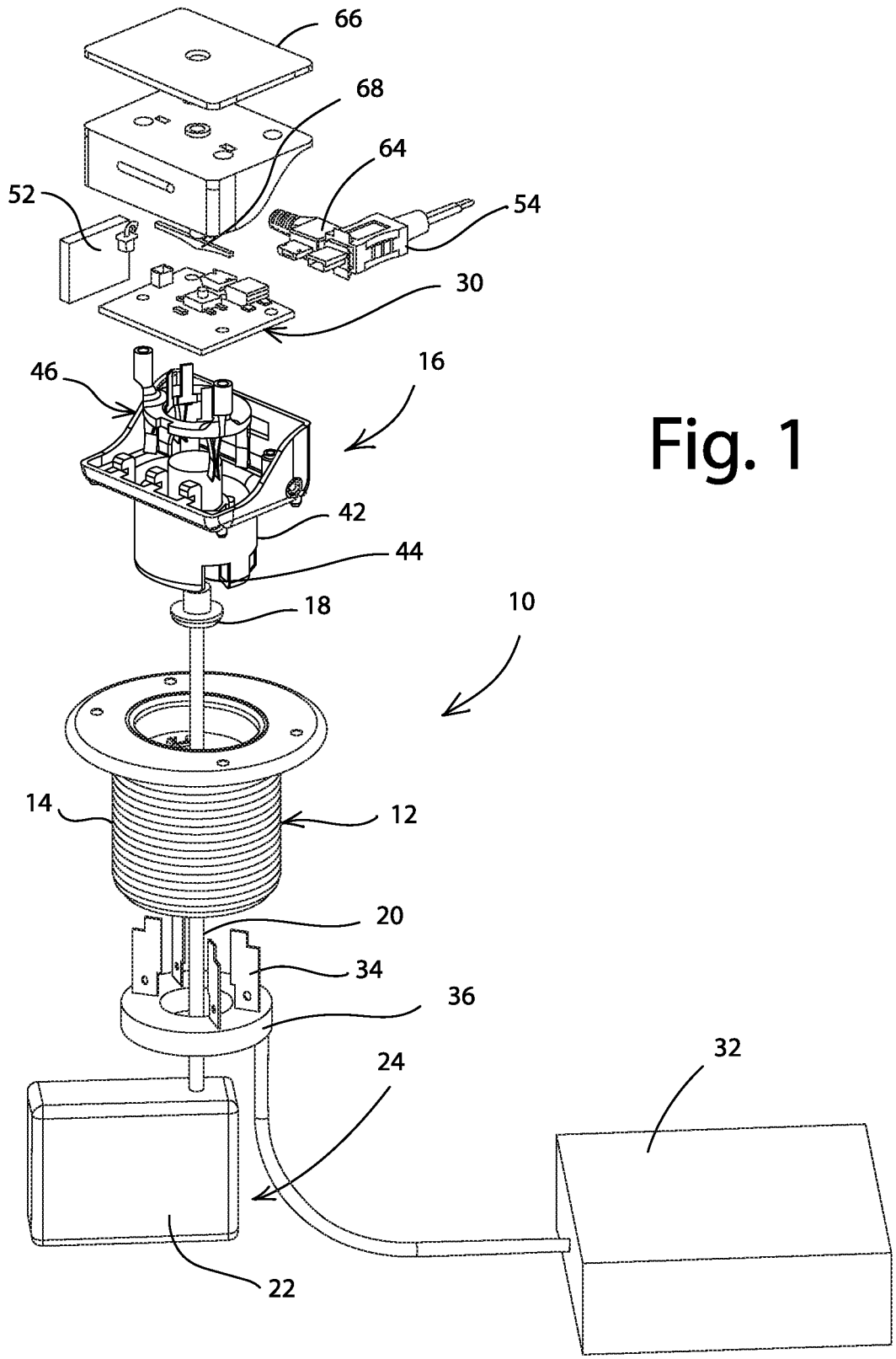
FIG. 1 is an exploded pictorial view of an improved display post constructed in accordance with the invention.

Referring now to the drawings, and first to FIG. 1, shown generally at 10 is a display for a hand-held consumer electronic device. The display 10 is an improvement over the display illustrated in U.S. Pat. Nos. 6,386,906 and 6,799,994. The '906 and '994 patents are identical disclosures. The design disclosed in these patents is incorporated by reference into the present disclosure.

The improvement described here includes a base 12 that is mounted to a display countertop or the like (not shown). This is typically accomplished by inserting the threaded portion 14 of the base down through a bore in the countertop's surface. A threaded member, or threaded ring, screws onto threads 14 from underneath the countertop, thus holding the base firmly in position. This type of mounting means is conventional and has been used with displays of the kind described here for many years.

The device 10 includes a "puck" portion 16 that is connected to an end 18 of a steel cable 20. The steel cable 20 extends from and retracts back into a housing 22. This particular collection of retractor parts is referred to herein as a steel retractor cable 24. The steel retractor cable 24 is conventional in design and would be familiar to those having knowledge and experience with retail security systems.

Figure 2:
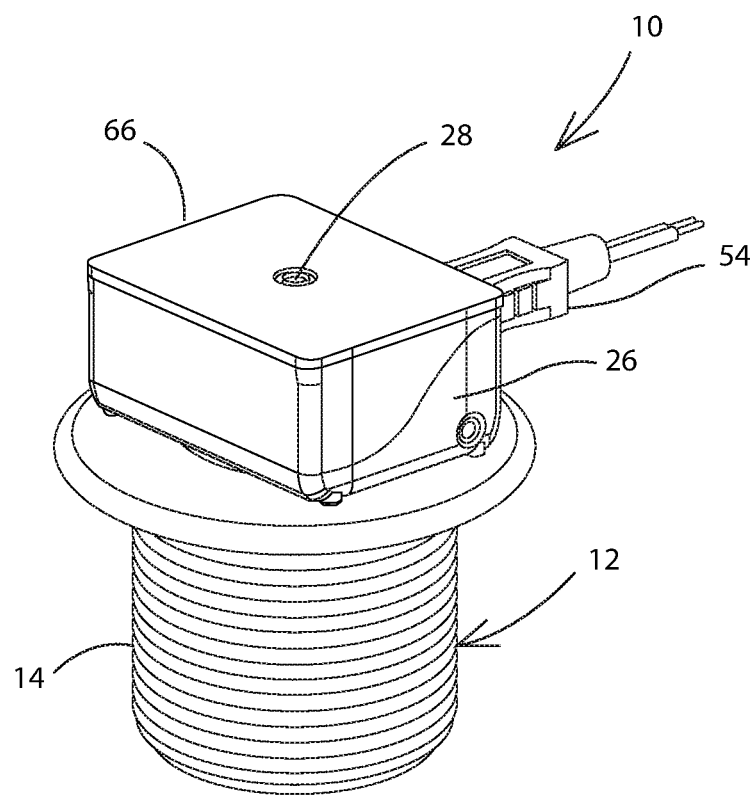
FIG. 2 is a perspective, non-exploded view of the design shown in FIG. 1.

The puck 16 has a generally rectangular housing 26 (see FIG. 2). A camera or other hand-held (not shown—but see '906 and '994 patents) may be connected to the puck 16 via a conventional threaded fitting 28. The specific method of attachment is common and not unique to the design described here.

Inside the puck 16 is an electronics control board (ECB), indicated generally at 30. The ECB 30 carries various electronic components schematically illustrated in FIG. 8 (which is further described below). However, because the display 10 uses a steel retractor cable 20 in lieu of a multi-conductor cable, it is necessary to provide power to the ECB 30 in a different manner.

The display 10 will have a typical control (power and alarm) module 32 (e.g., under the countertop) that delivers power to a set of charge contacts 34. The charge contacts 34 are mounted to a base ring 36 that fits inside the base 12.

Figure 4:
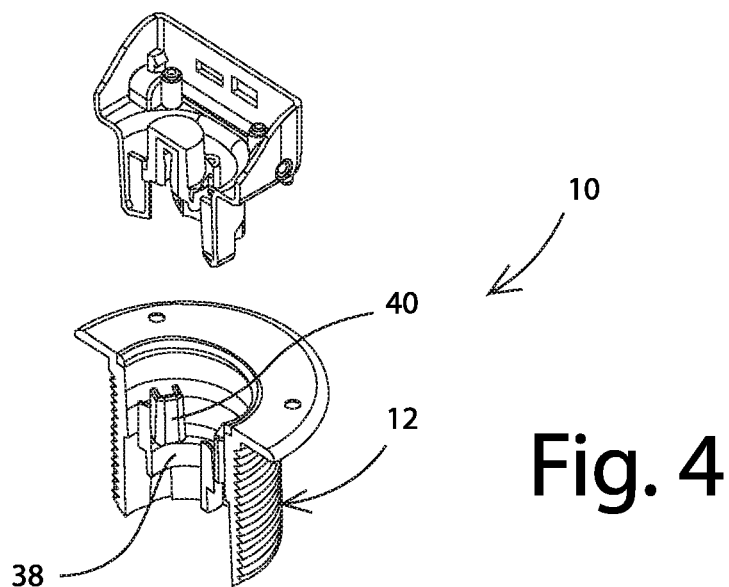
FIG. 4 is a partially exploded, sectional view of FIG. 3.
Figure 5:
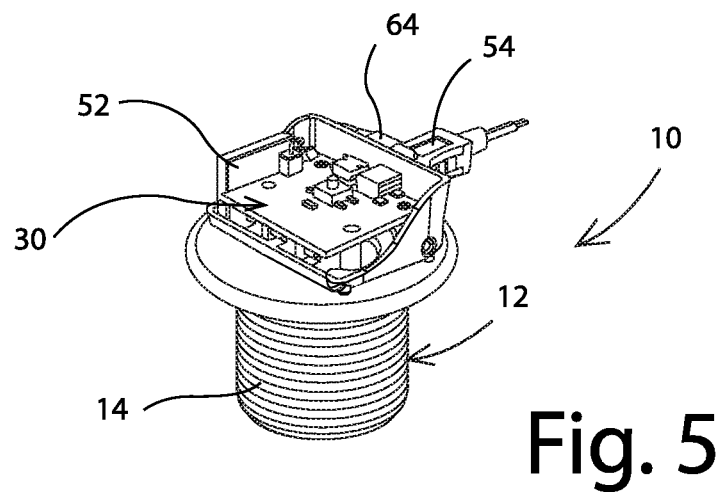
FIG. 5 is a view like FIG. 2, but with the "puck portion" of the design shown in partial section.
Figure 6:
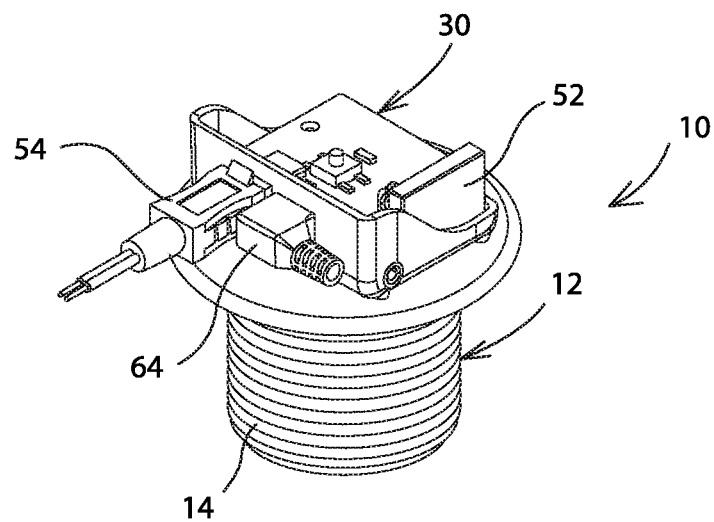
FIG. 6 is a view like FIG. 5, but is taken looking at the back side of the design relative to FIG. 5.
Figure 7:
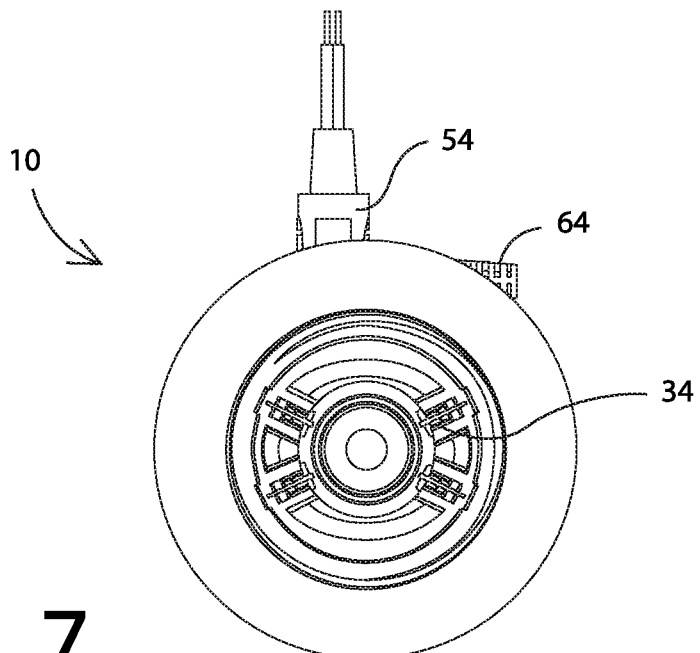
FIG. 7 is a bottom view of the device shown in FIGS. 1-6.

Referring to FIG. 4, for example, the upper surface of ring 36 abuts against an annulus or annular shoulder 38 inside the base 12. The charge contacts sit within rectangular guide sockets 40. Referring back to FIG. 1, the base 42 of puck 16 has slots 44 that mate with sockets 40 in base 12.

Figure 3:
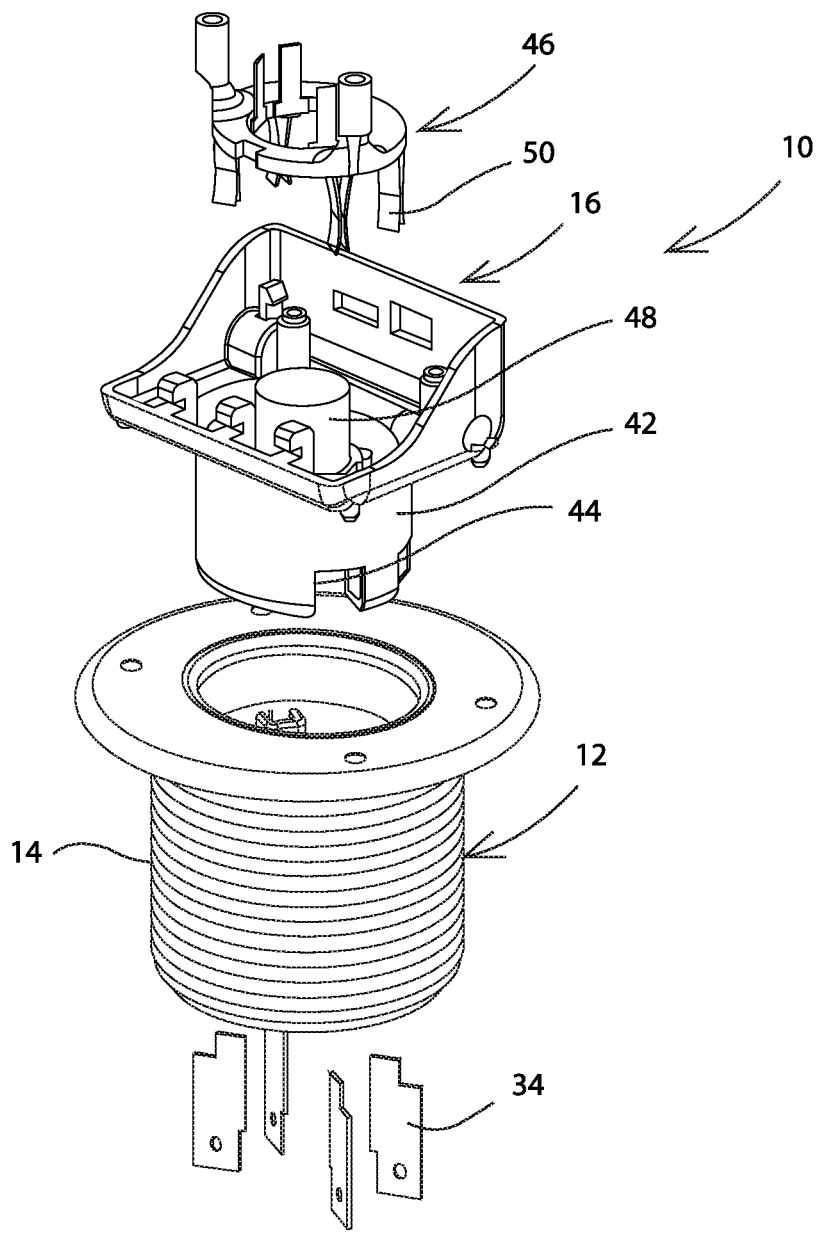
FIG. 3 is a partially exploded view of FIG. 2.

Mounted below the ECB 30 is a charge contact ring, indicated generally at 46. The charge contact ring 46 is illustrated more clearly in FIG. 3. It rests around a center post 48 when it is nested inside the puck's housing 26. It has a set of female charge contacts 50 that connect to charge contacts 34 in the base, when the puck 16 is in the resting position shown in FIG. 2.

When the puck 16 is at rest (see FIG. 2), the charge contacts 50 in the puck are connected to the charge contacts 34 in the base, thus creating a direct, single input electrical connection between the power supply module 32 and puck 16, that is, directly to the ECB 30 in the puck. During this time, power is supplied to a battery 52 that is connected to the ECB 30. The ECB 30 serves to convey power to and from battery 52 in this particular embodiment. In other words, the ECB 30 serves to convey power to the battery 52 as it recharges when the puck 16 is at rest. The battery 52 also supplies necessary power back to electrical components on the ECB 30 when the puck 16 is lifted from the base 12, for operating various components under the ECB's control. As summarized earlier, there are different variations to this design, as follows.

First, the ECB board 30 is designed to take advantage of those hand-helds that are displayed with batteries in them (typically, cell phones). When the display 10 is used for this type of device, power that is communicated to the puck, when the puck 16 is at rest, flows through contacts 34, 50 to the ECB 30 in the puck and then to both the battery 52 in the puck and the battery in the hand-held—for the purpose of charging both batteries. Power to the hand-held battery will be supplied via a conventional patch cord or smart cable 54 (see description below) power connection. When the puck 16 is lifted from the base 12, the contacts between charge contacts 34 and 50 are broken, which means the hand-held operates on its own charged batteries at that point in time. This is the "hybrid" design summarized above.

Depending on the technical application, the ECB 30 may or may not provide voltage regulation functionality. In other words, when the display 10 is used as a "universal" device that allows the swapping of different kinds of hand-helds with different power requirements, the control module 32 supplies sufficient power, via contacts 34, 50, 32, to generate the electrical energy necessary to operate any type of hand-held that might be mounted to the display 10 after the puck/hand-held combination is lifted from the base piece 12. If needed, ECB 30 may provide the type of voltage regulation functionality currently in use with prior art designs. In such case, the design may include a patch cord similar to what the industry currently knows as a "smart cable" (see item 54 in FIG. 1) that is electrically connected to the ECB 30. As described previously, the smart cable 54 creates a power supply circuit to the hand-held, but it has a unique resister in the cable that steps down the voltage to a correct level for the hand-held.

Depending on the technical application, ECB 30 will usually need power independently of the hand-held when the charge contacts are broken, regardless of whether the hand-held has its own battery. Among other things, in preferred form, the ECB 30 carries a wireless device 56 for theft or security purposes (see FIG. 8A and item 56 schematically indicated in FIG. 11). In the hybrid version, the battery 52 continues to power the wireless device 56 during those times the puck 16 is at rest and then lifted from the base 12. The wireless device 56 is an off-the-shelf electrical component.

As suggested above, depending on the retailer's needs, it is likely a hybrid version of the design will be employed, as described above. That is, the electrical power storage device carried by the puck 16 will be in the form of what is essentially a two battery system—one battery being the one typically carried by the hand-held; the other battery being like battery 52 on the ECB 30.

Figure 9:
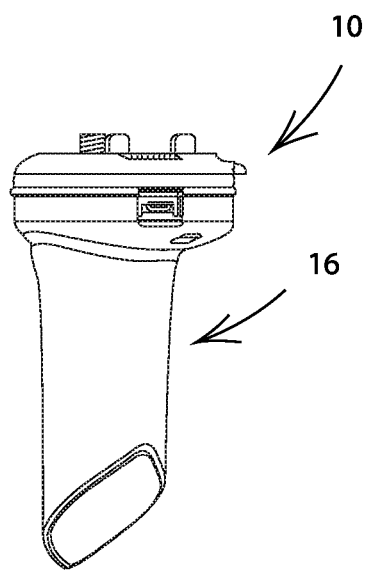
FIG. 9 is a side view of the alternative embodiment shown in FIGS. 1-8.
Figure 10:
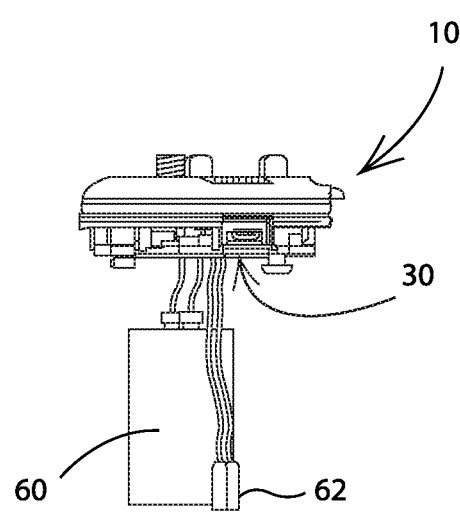
FIG. 10 is a partial interior view of the design shown in FIG. 9.

Yet another alternative embodiment is generally illustrated in FIGS. 9 and 10. Certain kinds of hand-helds are not displayed with their rechargeable batteries, but nevertheless need a power supply when the puck 16 is lifted. In that alternative, the footprint of the puck 16 is enlarged to carry a higher capacity battery 60. The charging contacts 62 in this alternative design will have a slightly different physical configuration than the charge contacts 34, 50 described above. However, they conceptually work in substantially the same way.

This alternative embodiment is intended for use in situations where different hand-helds are to be swapped to and from the puck 16, and it is needed to have sufficient power carried by the puck for operating any hand-held. In this example, the ECB 30 may regulate both charging and discharging of the battery 60 when the puck 16 is respectively at rest or is lifted. Other parts of the puck design are conventional relative to prior designs that have been in the field for many years, including use of "smart cables" and voltage regulation on the ECB as needed.

The puck 16 includes means for attaching a secondary alarm sensor 64 to the electronic device. The use of secondary sensors is well-known in the art. A typical example is illustrated in U.S. Pat. No. 5,861,807, which is incorporated herein by reference.

The puck 16 will also have a primary alarm sensor that is triggered if the hand-held is physically disconnected from the puck. This is a common design feature and need not be further described here. It may be desirable to include a VHB pad 66 on the top surface of the puck's housing 26. The puck is likely to have a primary sensor trigger 68. While the physical look changes from one embodiment to the next, these specific components are generally familiar to a person of ordinary skill in the art. The implementation of primary and secondary sensors in this field is known.

Figure 8:
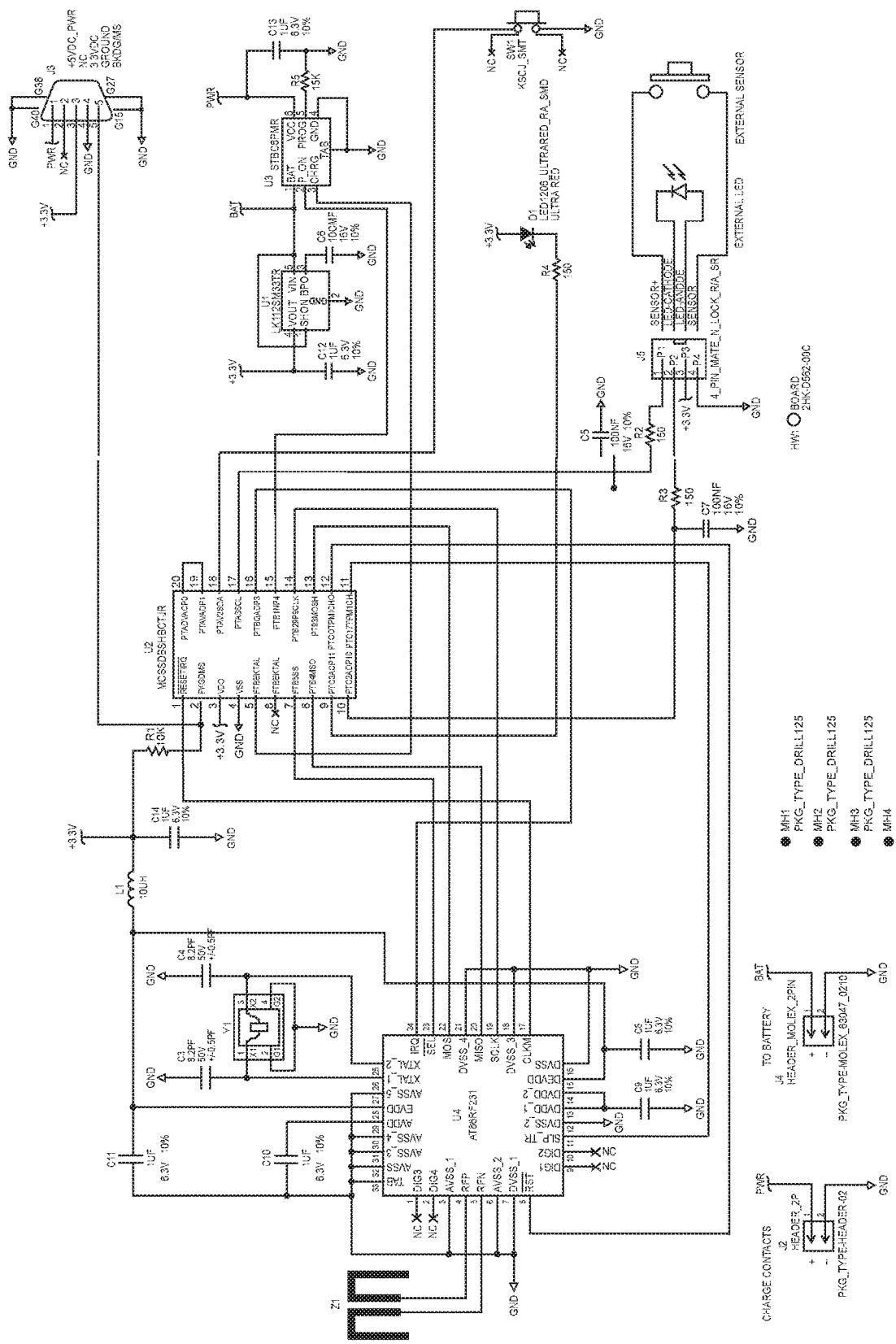
FIG. 8 is an electrical schematic for the "puck" electronics.
Figure 8A:
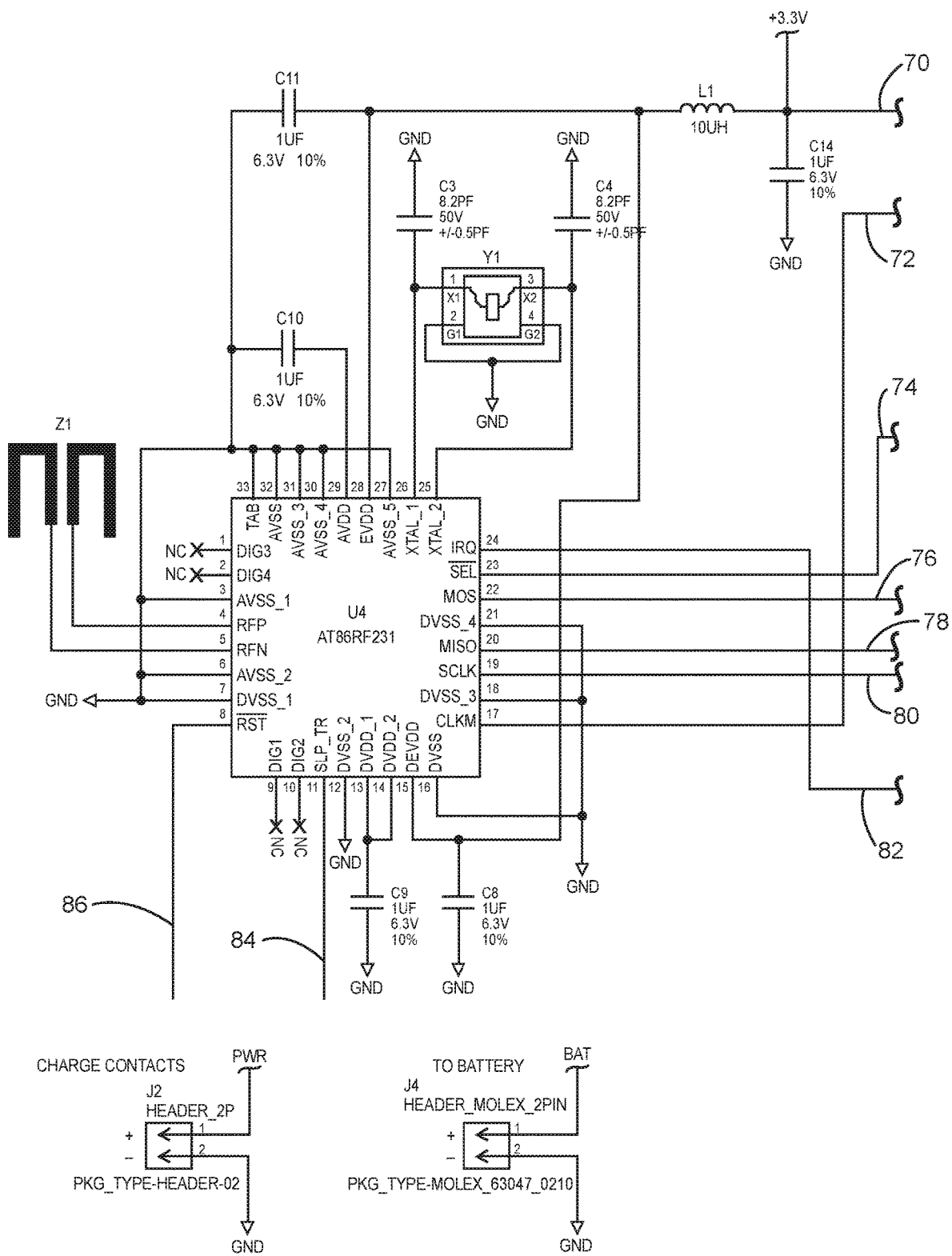
FIG. 8A is an enlarged view of the left-hand portion of FIG. 8.
Figure 8B:
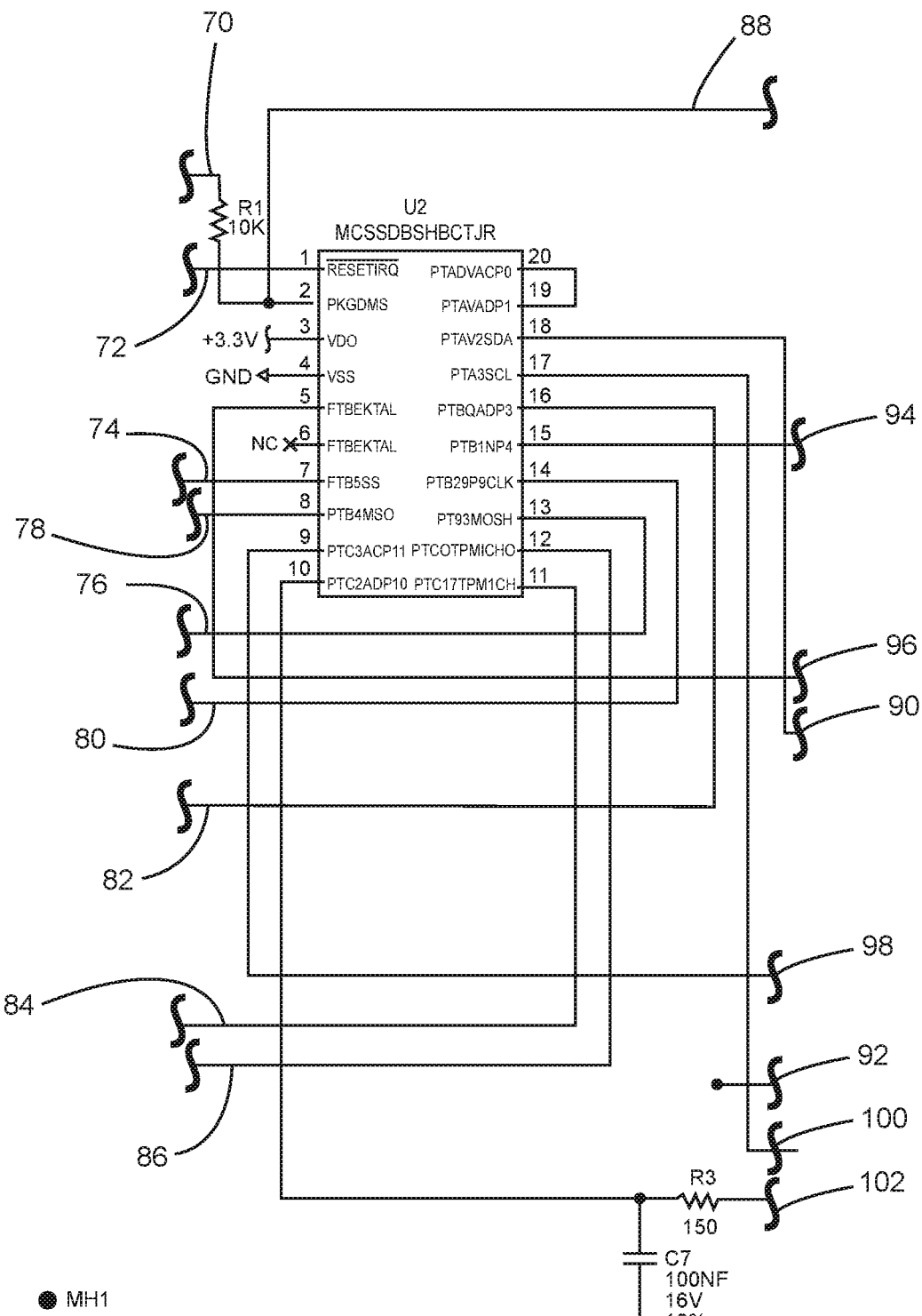
FIG. 8B is an enlarged view of the central portion of FIG. 8.
Figure 8C:
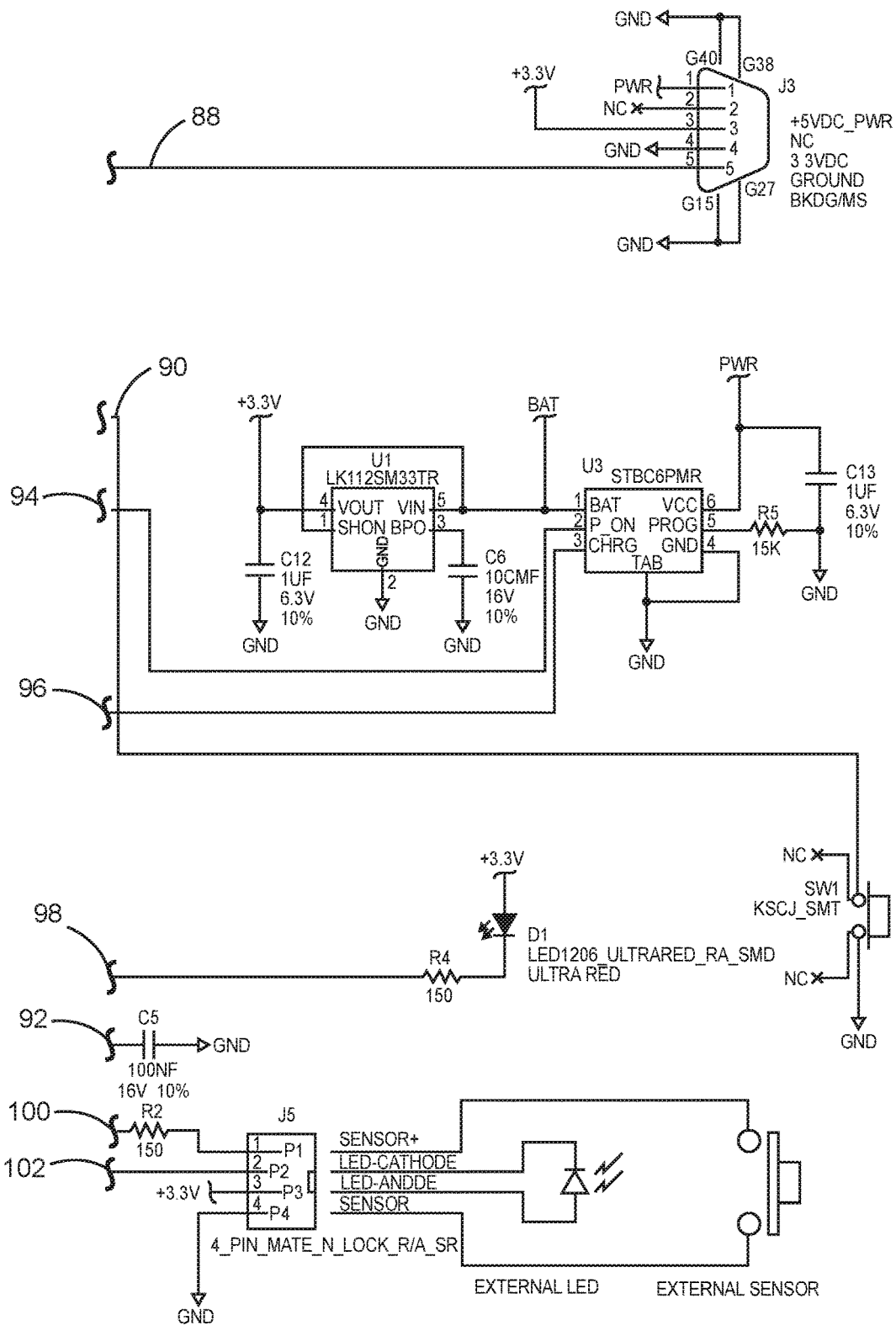
FIG. 8C is an enlarged view of the right-hand portion FIG. 8.

FIG. 8 is an electrical schematic for the ECB 30. FIGS. 8A-C break down FIG. 8 into three sections. FIG. 8 is illustrative of one way to enable the ECB 30 inside puck 16 to charge the rechargeable storage device carried by the puck 13 whether it be the battery 52 or the hybrid version of the invention described above. It also illustrates the electronic circuitry for the wireless device 56.

Reference numerals 70, 72, 74, 76, 78, 80, 82, 84 and 86 correspond to like connections on the left-hand side of FIG. 8B. Likewise, reference numerals 88, 90, 92, 94, 96, 98, 100 and 102, in FIG. 8B correspond to like connections on the left-hand side of FIG. 8C. It is to be appreciated that FIG. 8 illustrates ECB electronics for what is believed will be the most common implementation of the invention.

Figure 11:
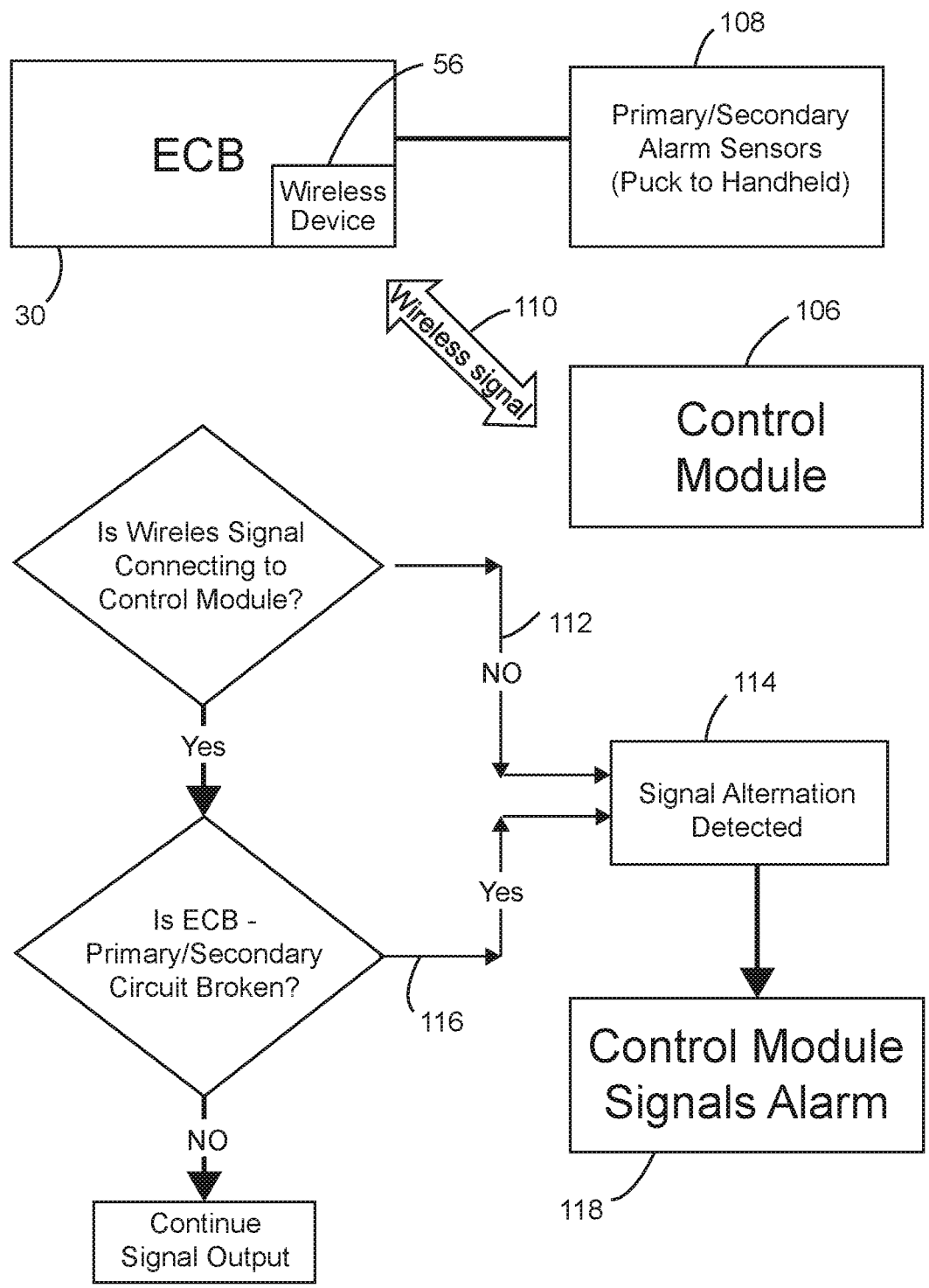
FIG. 11 is a schematic view that illustrates the operation of the wireless alarm feature in the device.

FIG. 11 schematically illustrates the connection between the wireless device 56 and a control module 106. As described above, the wireless device 56 is powered by the battery 52 in the puck when it is lifted (the device also operates when the puck is at rest). As indicated above, it will typically be mounted to the ECB 30. Wireless devices of this type are well-known.

As described above, a closed loop circuit arrangement will exist between the ECB 30 and primary or secondary alarm sensors 108. For reference purposes, one type of alarm sensor could be a spring loaded pin, like pin 46 described in U.S. Pat. No. 6,946,961. U.S. Pat. No. 6,946,961 is incorporated herein by reference and also illustrates the positioning of alarm assemblies and control modules for displays of the type described here. Another type of sensor, usually called "secondary," is illustrated in U.S. Pat. No. 5,861,807, also incorporated herein by reference. The difference between primary and secondary alarm sensor functions would be familiar to those having knowledge of power and security displays for consumer electronics.

In preferred form, the wireless device 56 will transmit a different signal to the alarm module if one of two events takes place (see item 110). First, the wireless device 56 will transmit a different signal if its proximity goes beyond a certain distance from the alarm module, as indicated at 112. Under these circumstances a signal alteration 114 is detected that indicates a connection change due to distance or some other reason that may suggest a security alarm event. This type of functionality can be accomplished with or without a steel retractor cable.

Next, if a primary/secondary alarm circuit is broken, then it triggers a similar signal alteration event, as indicated at 116. Both detectable events would correspond to an unauthorized removal of the puck 16 from the base 12, thus necessitating a security alarm 118. This type of functionality is consistent with security alarm sensors presently in use.

It likely that there will be new ways of implementing the design described here as technology changes. As an example, the use of one or more batteries carried by the puck may eventually evolve into some other type of device (i.e., capacitance) that is capable of performing the same functionality. There are commonly known wireless transmitters that are capable of carrying out the functionality described here, but new types may evolve in the future. The problem solved by the present invention is that it eliminates the hard-wiring of power and alarm functions from a display puck via the use of a multi-conductor retractor cable. Therefore, the invention described above is not to be limited to the particular details of the foregoing description. Instead, the scope of the invention and/or the scope of the patent right is to be limited only by the patent claims, the interpretation of which is to be made in accordance with standard doctrines of patent claim interpretation as per the various disclosures in this document.

What is claimed is:

1. A display for the sale of a hand-held consumer electronic device, the display including:
   an alarm system; and
   a mounting puck for the hand-held device, the puck being configured to be lifted from a resting position on a display surface with the hand-held device detachably connected to the puck, wherein the puck comprises:
      a rechargeable power storage device for operating the hand-held electronic device, the rechargeable power storage device being carried by the puck when the puck is lifted, wherein the rechargeable power storage device is charged with power from a power source that is electrically coupled to the rechargeable power storage device carried by the puck only when the puck is in the resting position, with the puck providing electrical coupling between the power source and rechargeable power storage device when the puck is in the resting position; and
      a wireless device that wirelessly communicates a wireless signal to the alarm system; and
   wherein the alarm system receives the wireless signal, detects an alteration based on the received wireless signal if the wireless device moves beyond a defined distance relative to a reference, and triggers an alarm signal in response to the detected alteration.

2. A display for the sale of a hand-held consumer electronic device, the display including:
   an alarm system; and
   a mounting puck for the hand-held device, the mounting puck being configured to be lifted from a resting position on a display surface, wherein the mounting puck comprises:
      a rechargeable power storage device for the hand-held device, the rechargeable power storage device being carried by the mounting puck when the mounting puck is lifted; and a wireless device carried by the mounting puck that is operative via the rechargeable power storage device when the mounting puck is lifted from the resting position to (1) wirelessly communicate a first wireless signal to the alarm system for use in determining a proximity of the wireless device relative to a reference, and (2) wireless communicate a second wireless signal to the alarm system for use in triggering an alarm signal upon unauthorized removal of the hand-held device from the mounting puck; and wherein the alarm system receives the first and second wireless signals, detects an alteration based on the received first wireless signal that indicates a loss of proximity of the wireless device relative to the reference, and triggers an alarm signal in response to the detected alteration and/or the received second wireless signal.

3. A display for the sale of a hand-held consumer electronic device, the display including:

an alarm system; and a mounting puck for the hand-held device, the mounting puck being configured to be lifted from a resting position on a display surface and tethered to the display by a retractable steel cable, wherein the mounting puck comprises:

a rechargeable power storage device for operating the hand-held device, the rechargeable power storage device being carried by the mounting puck when the mounting member is lifted; and a wireless device carried by the mounting puck that is operative to (1) wirelessly communicate a first wireless signal to the alarm system for use in determining a proximity of the wireless device relative to a reference, and (2) wireless communicate a second wireless signal to the alarm system for use in triggering an alarm signal upon unauthorized removal of the hand-held device from the mounting puck; and wherein the alarm system receives the first and second wireless signals, detects an alteration based on the received first wireless signal that indicates a loss of proximity of the wireless device relative to the reference, and triggers an alarm signal in response to the detected alteration and/or the received second wireless signal.

4. The display of claim 1 wherein the alarm system includes a controller that is remote from the puck, and wherein the reference is a location of the controller.

5. The display of claim 1 further comprising:

a base on which the puck rests when the puck is in the resting position; and a retractor cable that tethers the puck to the base.

6. The display of claim 5 wherein the retractor cable does not include multiple conductors.

7. The display of claim 1 wherein the wireless device is powered by the rechargeable power storage device when the puck is lifted from the resting position.

8. The display of claim 2 wherein the alarm system includes a controller that is remote from the puck, and wherein the reference is a location of the controller.

9. The display of claim 2 further comprising:

a base on which the mounting puck rests when the mounting puck is in the resting position; and a retractor cable that tethers the mounting puck to the base.

10. The display of claim 9 wherein the retractor cable does not include multiple conductors.

11. The display of claim 3 wherein the alarm system includes a controller that is remote from the puck, and wherein the reference is a location of the controller.

12. The display of claim 3 further comprising:

a base on which the puck rests when the puck is in the resting position; and wherein the retractable steel cable tethers the mounting puck to the base.

13. The display of claim 3 wherein the retractable steel cable does not include multiple conductors.

14. The display of claim 3 wherein the wireless device is powered by the rechargeable power storage device when the mounting puck is lifted from the resting position.

15. The display of claim 1 wherein the mounting puck further comprises an alarm sensor configured to detect an unauthorized removal of the hand-held device from the puck; and wherein the wireless device is further configured to wirelessly communicate a first wireless signal if movement of the mounting puck causes the wireless device to lose proximity to the reference even if the hand-held device remains detachably connected to the mounting puck, and (2) wirelessly communicate a second wireless signal in response to a detection by the alarm sensor of the unauthorized removal of the hand-held device from the puck; and wherein the alarm system receives the second wireless signal, and triggers an alarm signal based on the received second wireless signal.

16. The display of claim 15 wherein the alarm sensor comprises a mechanically-triggered sensor.

17. The display of claim 2 wherein the mounting puck further comprises an alarm sensor configured to detect the unauthorized removal of the hand-held device from the mounting puck; and wherein the alarm system detects the alteration when movement of the mounting puck causes the wireless device to lose proximity to the reference even if the handheld device remains detachably connected to the mounting puck.

18. The display of claim 17 wherein the alarm sensor comprises a mechanically-triggered sensor.

19. The display of claim 3 wherein the mounting puck further comprises an alarm sensor configured to detect the unauthorized removal of the hand-held device from the mounting puck; and wherein the alarm system detects the alteration when movement of the mounting puck causes the wireless device to lose proximity to the reference even if the handheld device remains detachably connected to the mounting puck.

20. The display of claim 19 wherein the alarm sensor comprises a mechanically-triggered sensor.

* * * * *